United States Patent [19]

Breuers

[11] 4,432,124

[45] Feb. 21, 1984

[54] MARKER RING INSTALLATION TOOL

[75] Inventor: Manfred O. Breuers, Rödermark, Fed. Rep. of Germany

[73] Assignee: Idento-Gesellschaft für Industrielle Kennzeichnung mbH, Rödermark, Fed. Rep. of Germany

[21] Appl. No.: 294,174

[22] Filed: Aug. 19, 1981

[30] Foreign Application Priority Data

Aug. 25, 1980 [DE] Fed. Rep. of Germany ....... 3031987

[51] Int. Cl.$^{3}$ ............................................ B23P 19/02

[52] U.S. Cl. ..................................................... 29/235

[58] Field of Search .................. 29/235, 270, 758, 745

[56] References Cited

U.S. PATENT DOCUMENTS

| | | | |
|---|---|---|---|
| 2,661,487 | 12/1953 | Hicks et al. | 29/270 |
| 2,764,160 | 9/1956 | Alexander et al. | 29/235 |
| 4,034,450 | 7/1977 | Carlomagno et al. | 29/745 |

*Primary Examiner*—James L. Jones, Jr.
*Attorney, Agent, or Firm*—Michael J. Striker

[57] ABSTRACT

A marking device for applying split rings provided with a mark onto electrical wires of different diameters is constituted by a supply rod for supporting a series of marking rings, an application shoe formed at one end of the rod and having a flared configuration, the bottom of the shoe being provided with a recess communicating with the free end of the shoe and converging toward the supply rod, and the front side of the shoe being split by a V-shaped notch into two prongs which resiliently accommodate the shoe to wires of different diameters.

3 Claims, 4 Drawing Figures

Fig. 1
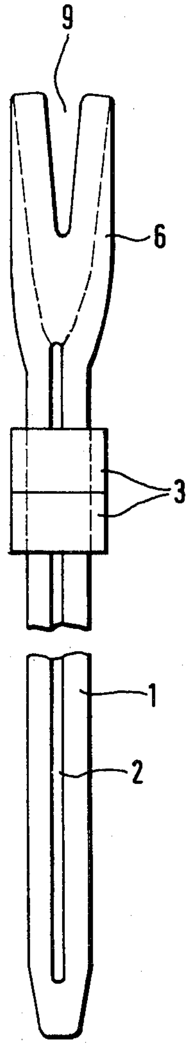
Fig. 2
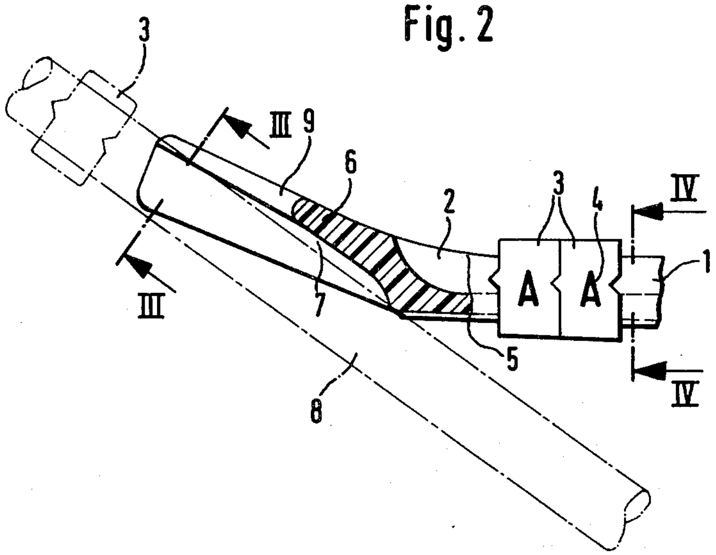
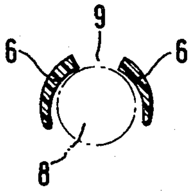
Fig. 3
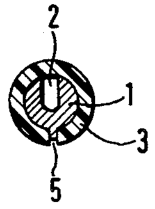
Fig. 4

MARKER RING INSTALLATION TOOL

BACKGROUND OF THE INVENTION

The present invention relates in general to devices for making electrical wires, and in particular to a device of the type which supports on a supply rod a succession of resilient split rings each provided with a marking symbol on its outer surface, whereby the front part of the rod extends into an application shoe which is formed on its lower surface with a recess which is supplied on a wire to be marked, and the marking split ring is shifted over the application shoe onto the wire.

Markers of this type are known, for example from the German Pat. No. 26 55 958, and are used for applying marking rings of plastic material onto electrical wires. For this purpose, the recess of the application shoe or foot at the end of the supply rod is placed on the wire to be marked and subsequently one or more plastic rings with the marking symbols are shifted over from the supply rod via the shoe onto the wire. When the plastic split rings slide over the diverging application shoe, they are sufficiently opened out at their slits to resiliently engage the wire.

In order to reduce storage expenses for such plastic marking rings and the corresponding supply rods, the rings of certain inner diameter are normally used not only for a wire of this particular diameter but for a whole range of wire thicknesses close to the diameter of the marking ring. In determining the applicability of a marking ring of a particularly inner diameter to a certain range of wire thicknesses, it must be taken into consideration what is the permanent residual expansion of the ring after its sliding over the application shoe, and if the sliding movement of the ring on the wire should be prevented.

Accordingly, the inner diameter of the marking ring is determined by the outer diameter of the thinnest wire of the group, the size of the application shoe is determined by the diameter of the thickest wire of the group because even the thickest wire should fit in the bottom recess of the shoe. It is this maximum dimension of the shoe which brings about a problem resulting from the enlargement of the plastic ring when shifted past the broadest part of the shoe. This enlargement causes a relatively large permanent extension of the ring, and consequently the applicability of the shoe for use with wires of smaller diameters is impaired.

SUMMARY OF THE INVENTION

It is therefore a general object of the present invention to overcome the aforementioned disadvantages.

More particularly, it is an object of the invention to provide an improved marker of the aforedescribed type which is designed for marking with a plastic split ring of a predetermined inner diameter a wide range of electric wires without causing an excessive permanent enlargement of the rings due to the maximum breadth of the application shoe.

In keeping with these objects and others which will become apparent hereafter, one feature of the invention resides, in a marker of the aforedescribed type, in the provision of a flared application or contact shoe which is formed with a bottom recess and with an elongated slot opening into the free end of the shoe to form at least in the front part of the recess two prongs which adjust themselves to wires of smaller diameters when marking rings slide thereon into contact with the wire.

Since by virtue of this resiliently adjustable prong arrangement the contact shoe can be adjusted to smaller diameters of electric wires, the plastic marking ring is opened up by the shoe to such an extent only as is indispensable for a particular wire. An application shoe, when applied to a wire of a certain diameter, has the prongs adjust themselves without effort both to thicker and to thinner wires, and the plastic marking ring is not unnecessarily enlarged. As a consequence, frictional resistance of the ring during its shifting on the shoe is reduced, and the force necessary for displacing the plastic rings from the marker to the wire is correspondingly smaller. This advantage is of particular importance when considering the fact that a worker, when applying marking rings on cable pieces in a switching console for example, applies during a working day several thousand of such rings while manually shifting the same over the application shoe. If force necessary for this manual operation is too large, the efficiency of the worker is unfavorably affected, and the worker may even become disabled because of formation is blisters on the fingers.

In the preferred embodiment of this invention, the elongated slot has a V-shape diverging toward the front side of the shoe. In this manner, the contraction of the prongs when plastic marking rings are applied to thinner wires is greatly facilitated. Preferably, the elongated slot extends over the entire front half of the contact shoe, so as to ensure a sufficient flexiblity of the prongs while maintaining overall stability of the shoe.

Advantages attained by the marker of this invention will be more fully appreciated from the following numerical example:

Provided that the recess in the contact shoe is designed for accommodating electrical wires having diameters between 1.9 and 2.65 mm to be marked by plastic split rings having inner diameters of 1.9 mm, then conventional application or contact shoes must have a breadth exceeding 2.65 mm. By contrast, when the elongated tapering notch according to this invention is provided in the application shoe, then a width of 2.4 mm for the shoe is sufficient for handling the aforementioned group of wire diameters. For instance, if an electrical wire has a diameter of 1.9 mm, the prongs of the notched shoe are resiliently contracted toward the wire by the displaced marking ring; in the opposite case, when the wire to be marked has a diameter of 2.65 mm, the prongs of the shoe due to the elongated cut-out are flexibly extended by the wire. Due to the fact that plastic marking rings during their feeding over the application shoe of this invention are relatively little enlarged, the resulting permanent deformation of the rings is therefore negligible. A plastic marking ring having an inner diameter of 1.9 mm, for example, firmly seats on an electrical wire of a diameter of 1.95 mm.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a top view of a marker according to this invention;

FIG. 2 is a sectional side view of a marker of FIG. 1 shown in its working position in contact with an electrical wire to be marked; and FIGS. 3 and 4 are sectional views taken respectively along the lines III—III and IV—IV in FIG. 2.

DESCRIPTION OF THE PREFERRED EMBODIMENT

The illustrated marker for electrical wires and the like is made of a suitable plastic material and is constituted of a supporting rod 1 which, for the sake of weight reduction, may be formed with a longitudinal groove 2. The supporting rod 1 supports a series of marking split rings 3 of plastic material which are provided with desired marking signs 4. The lower side of the supporting rod 1 opposite the groove 2 has a longitudinal fin 5 is provided for engaging the slots in the markings 3 to keep the series of rings in a stable position on the supporting rod 1.

The front end of supporting rod 1 is extended to form a flared application or contact shoe 6 which at its lower side has a recess 7 communicating with the free end of the shoe as indicated by dashed lines in FIG. 1. Lateral walls of the recess 7 diverge towards the free end of the shoe so as to accommodate different diameters of an electrical wire 8 to be marked.

The front side of application shoe 6 is formed with a V-shaped elongated cut-out 9 extending in axial direction over the front half of the recess 7. Due to this cut-out 9, the resulting fork-like shape of the shoe 6 permits, due to the elasticity of the plastic material of the marker, a yielding adjustment of the prongs of the shoe to particular wire diameters. For example, when the application shoe 6 is placed on a relatively thick electrical wire 8, the prongs of the fork-shaped end of the shoe 6 are laterally extended. On the other hand, if the recess 7 of shoe 6 engages a relatively thin wire 8, the prongs of shoe 6 are contracted toward this wire when the marking ring 3 is shifted from the supporting rod 1 over the shoe 6.

In this exemplary embodiment illustrated in the drawings, a supporting rod 1 for supplying the marking rings 3 is of a relatively large diameter. For this reason, to save weight the rod 1 is formed with a longitudinal weight-saving groove 2. When rods 1 of smaller diameter are employed, the groove 2 can be dispensed with. In the case when exceedingly thin supporting rods are used, the latter can be provided with a parallel reinforcing rod as known from prior art, such as for example in the German patent No. 23 55 958.

FIG. 3 illustrates the prongs of application shoe 6 in their outwardly extended position when a wire 8 of larger diameter is inserted in the range of the elongated notch 9. FIG. 4 illustrates the arrangement of marking split rings 3 in engagement with guiding fin 5 on the supporting rod 1.

It will be understood that each of the elements described above, or two or more together, may also find a useful application in other types of constructions differing from the types described above.

While the invention has been illustrated and described as embodied in a marker for use with marking split rings of plastic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A marker ring installation tool for applying resilient split rings provided with marking signs onto electrical wires, comprising a supply rod for supporting a series of marking rings, a flared contact shoe formed at one end of the rod and having a front side of a width which exceeds the diameter of the rod and a bottom recess communicating with the free end of the shoe and converging toward the rod for engaging wires of different diameters, and an elongated notch formed at the front side and communicating with the free end of the shoe to split the latter in the range of said recess into a flexible fork-like configuration suitable for resiliently adjusting the shoe to wires of different diameters.

2. A tool as defined in claim 1, wherein said elongated notch converges toward said supporting rod.

3. A tool as defined in claim 1, wherein the length of said notch exceeds half of a length of said shoe.

* * * * *